(12) United States Patent
Cheng et al.

(10) Patent No.: US 12,555,077 B2
(45) Date of Patent: *Feb. 17, 2026

(54) EVALUATION ADJUSTMENT FACTORING FOR BIAS

(71) Applicant: Capital One Services, LLC, McLean, VA (US)

(72) Inventors: Lin Ni Lisa Cheng, New York, NY (US); Vyjayanthi Vadrevu, Pflugerville, TX (US); Xiaoguang Zhu, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,009

(22) Filed: Jan. 29, 2024

(65) Prior Publication Data

US 2024/0169321 A1  May 23, 2024

Related U.S. Application Data

(63) Continuation of application No. 17/305,091, filed on Jun. 30, 2021, now Pat. No. 11,900,327.

(51) Int. Cl.
*G06Q 10/1053* (2023.01)
(52) U.S. Cl.
CPC ................. *G06Q 10/1053* (2013.01)
(58) Field of Classification Search
CPC ................................... G06Q 10/1053
See application file for complete search history.

(56) References Cited

U.S. PATENT DOCUMENTS

| 11,235,224 | B1* | 2/2022 | Venkateswaran | ............................ G06Q 50/2053 |
| 2003/0191680 | A1 | 10/2003 | Dewar | |
| 2006/0277056 | A1 | 12/2006 | Broberg et al. | |
| 2008/0167952 | A1 | 7/2008 | Blair | |
| 2009/0285456 | A1* | 11/2009 | Moon | ................. G06V 40/176 382/118 |
| 2012/0002848 | A1* | 1/2012 | Hill | ........................ G16Z 99/00 382/118 |
| 2015/0269529 | A1* | 9/2015 | Kyllonen | ........... G06Q 10/1053 705/321 |

(Continued)

OTHER PUBLICATIONS

Mujtaba, Dena F., and Nihar R. Mahapatra. "Ethical considerations in AI-based recruitment." 2019 IEEE international symposium on technology and society (ISTAS). IEEE, 2019. (Year: 2019).*

(Continued)

*Primary Examiner* — Corey Russ
(74) *Attorney, Agent, or Firm* — Harrity & Harrity, LLP

(57) ABSTRACT

In some implementations, a device may obtain interaction data for an evaluator in a communication session with an individual based on interactions of the evaluator with the individual during the communication session, wherein the evaluator is to provide the evaluation of the individual. The device may obtain evaluation information identifying the evaluation of the individual by the evaluator. The device may determine a degree of bias of the evaluator toward the individual during the communication session based on at least the interaction data. The device may adjust the evaluation of the individual based on the degree of bias of the evaluator.

20 Claims, 8 Drawing Sheets

(56) References Cited

U.S. PATENT DOCUMENTS

| | | |
|---|---|---|
| 2016/0055457 A1 | 2/2016 | Mather et al. |
| 2016/0354024 A1* | 12/2016 | Keshava ................. A61B 5/164 |
| 2017/0124468 A1 | 5/2017 | Bolshinsky et al. |
| 2017/0185652 A1 | 6/2017 | Bolshinsky et al. |
| 2017/0206504 A1* | 7/2017 | Taylor .................... G06V 20/30 |
| 2018/0089628 A1* | 3/2018 | Mather .............. G06Q 10/1053 |
| 2018/0089629 A1 | 3/2018 | Mather et al. |
| 2018/0341637 A1 | 11/2018 | Gaur et al. |
| 2019/0057356 A1* | 2/2019 | Larsen ................... G06V 40/28 |
| 2019/0354935 A1* | 11/2019 | Hanratty ............ G06Q 10/1053 |
| 2020/0143329 A1* | 5/2020 | Gamaliel ......... H04N 21/45455 |
| 2020/0372472 A1* | 11/2020 | Kenthapadi .......... G06N 3/0499 |
| 2021/0035047 A1 | 2/2021 | Mossoba et al. |
| 2021/0264373 A1* | 8/2021 | Garg ....................... G06N 3/09 |
| 2022/0067353 A1* | 3/2022 | Matteucci ............. G06F 18/214 |
| 2022/0101146 A1 | 3/2022 | El et al. |
| 2022/0172147 A1 | 6/2022 | Jose |
| 2022/0245594 A1* | 8/2022 | Baid ................... G06F 21/6245 |
| 2023/0004940 A1 | 1/2023 | Cheng et al. |
| 2023/0008904 A1 | 1/2023 | Venkataraman et al. |

OTHER PUBLICATIONS

Raghavan M., et al., "Mitigating Bias in Algorithmic Hiring: Evaluating Claims and Practices," Proceedings of the 2020 conference on fairness, accountability, and transparency ,2020, pp. 1-24.

\* cited by examiner

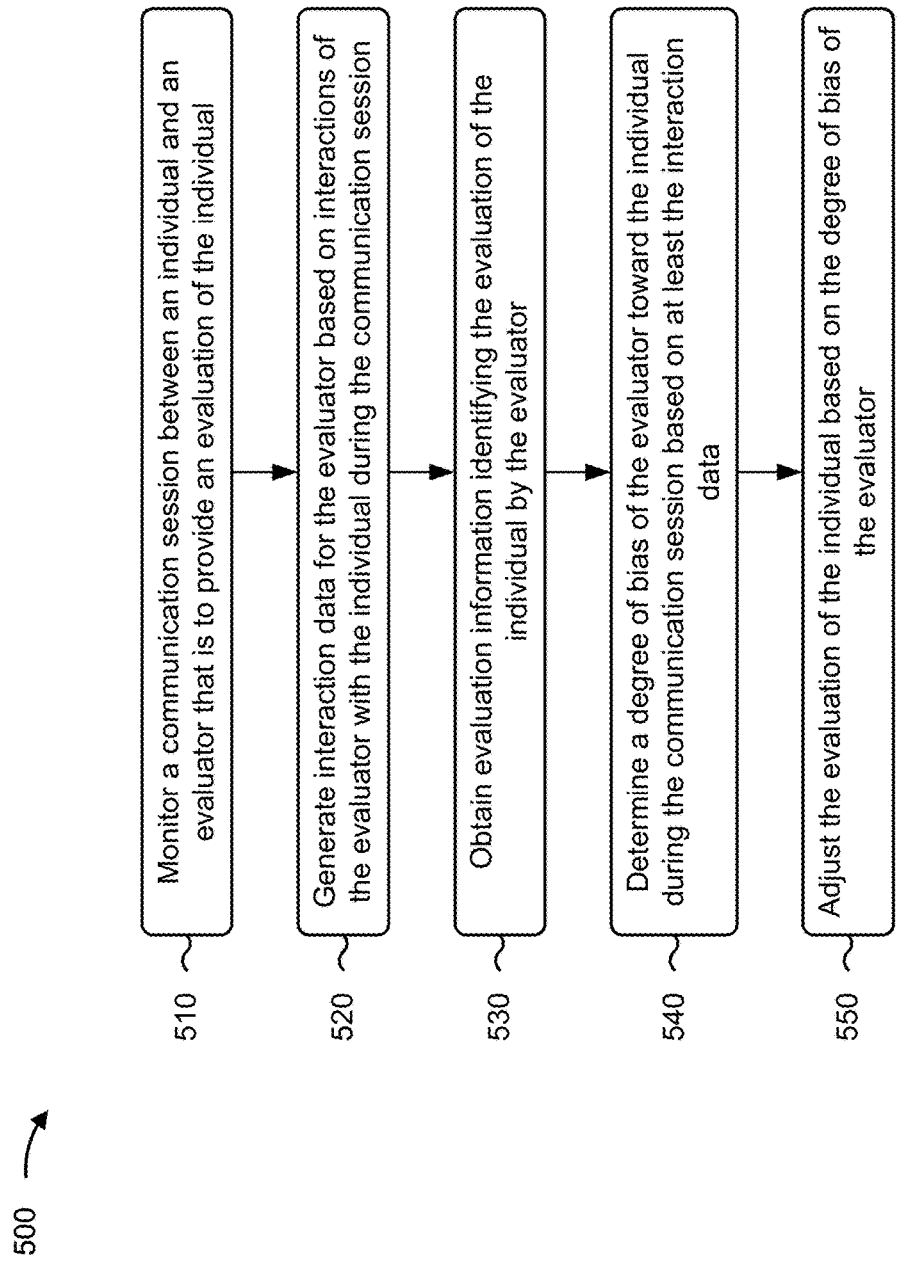

EVALUATION ADJUSTMENT FACTORING FOR BIAS

RELATED APPLICATION

This application is a continuation of U.S. patent application Ser. No. 17/305,091, filed Jun. 30, 2021, which is incorporated herein by reference in its entirety.

BACKGROUND

An interview is a conversation in which questions are asked and answers are given, such as a one-on-one conversation between an interviewer and an interviewee. The interviewer asks questions to which the interviewee responds, so that information may be transferred from interviewee to interviewer. Interviews may occur in person, although modern communications technologies (e.g., videoconferencing, teleconferencing, or the like) enable interviews to occur between geographically separate parties (e.g., the interviewee and the interviewer).

SUMMARY

Some implementations described herein relate to a system for adjusting an evaluation to factor for bias. The system may include one or more memories and one or more processors communicatively coupled to the one or more memories. The one or more processors may be configured to monitor a communication session between an individual and an evaluator that is to provide the evaluation of the individual. The one or more processors may be configured to generate interaction data for the evaluator based on interactions of the evaluator with the individual during the communication session. The one or more processors may be configured to obtain evaluation information identifying the evaluation of the individual by the evaluator. The one or more processors may be configured to determine a degree of bias of the evaluator toward the individual during the communication session based on at least the interaction data. The one or more processors may be configured to adjust the evaluation of the individual based on the degree of bias of the evaluator.

Some implementations described herein relate to a method of adjusting an evaluation to factor for bias. The method may include obtaining, by a device, interaction data for an evaluator in a communication session with an individual based on interactions of the evaluator with the individual during the communication session, where the evaluator is to provide the evaluation of the individual. The method may include obtaining, by the device, evaluation information identifying the evaluation of the individual by the evaluator. The method may include determining, by the device, a degree of bias of the evaluator toward the individual during the communication session based on at least the interaction data. The method may include adjusting, by the device, the evaluation of the individual based on the degree of bias of the evaluator.

Some implementations described herein relate to a non-transitory computer-readable medium that stores a set of instructions for a device for adjusting an evaluation to factor for bias. The set of instructions, when executed by one or more processors of the device, may cause the device to monitor a telecommunication session between an individual and an evaluator that is to provide the evaluation of the individual. The set of instructions, when executed by one or more processors of the device, may cause the device to generate, based on monitoring the telecommunication session, interaction data for the evaluator based on interactions of the evaluator with the individual during the telecommunication session. The set of instructions, when executed by one or more processors of the device, may cause the device to obtain evaluation information identifying the evaluation of the individual by the evaluator. The set of instructions, when executed by one or more processors of the device, may cause the device to determine a degree of bias of the evaluator toward the individual during the telecommunication session based on at least the interaction data and the evaluation information. The set of instructions, when executed by one or more processors of the device, may cause the device to adjust the evaluation of the individual based on the degree of bias of the evaluator.

BRIEF DESCRIPTION OF THE DRAWINGS

FIG. 5 is a flowchart of an example process relating to evaluation adjustment factoring for bias.

DETAILED DESCRIPTION

Figure 1A:
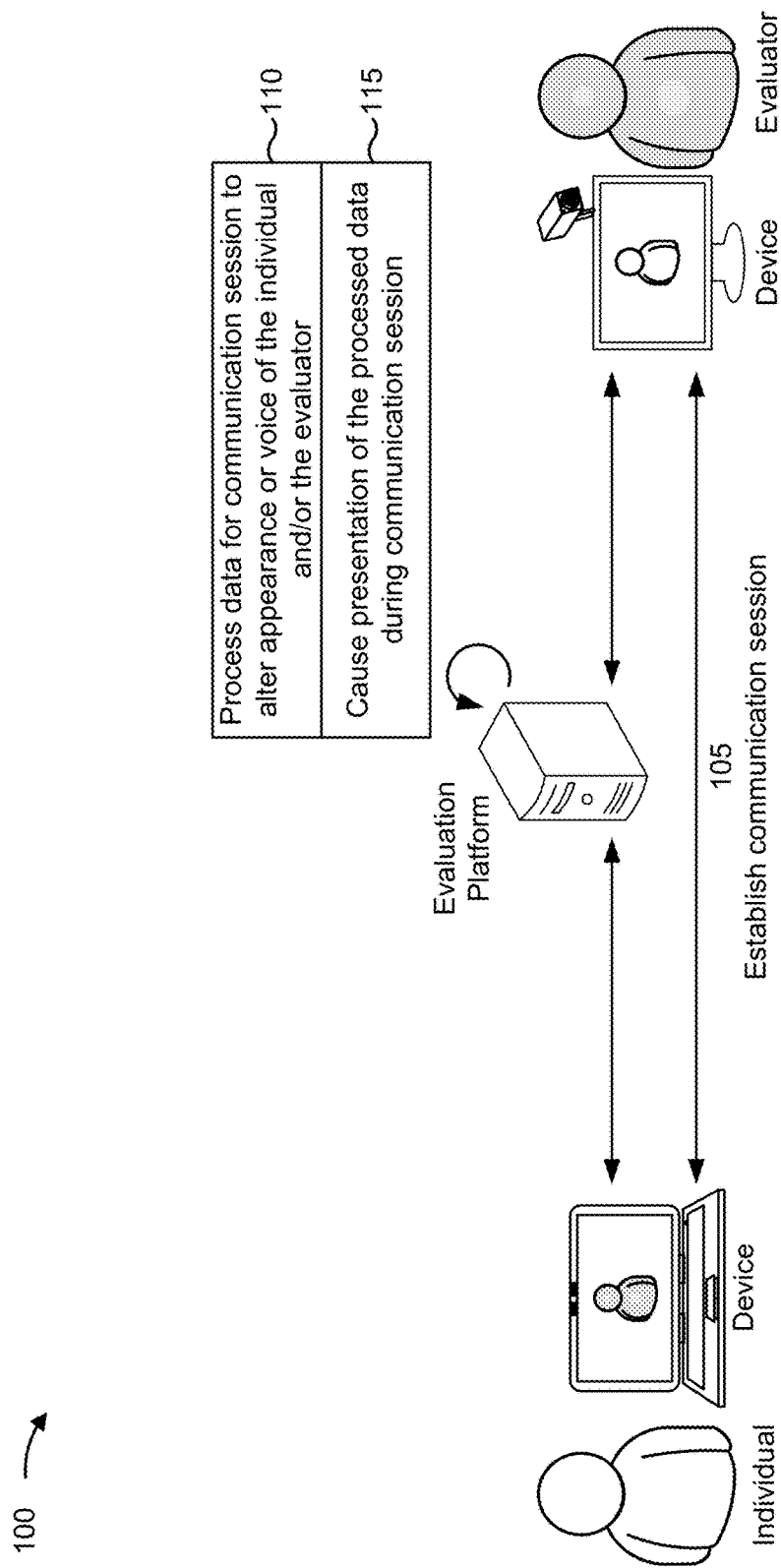
FIGS. 1A-1D are diagrams of an example implementation relating to evaluation adjustment factoring for bias.

The following detailed description of example implementations refers to the accompanying drawings. The same reference numbers in different drawings may identify the same or similar elements.

An evaluator (e.g., an interviewer) and an individual (e.g., an interviewee) may engage in a conversation to enable the evaluator to provide an evaluation of the individual. The evaluator may be provided with demographic information associated with the individual prior to or during the conversation and/or the evaluator may infer such demographic information during the conversation. In some cases, the evaluator may exhibit bias toward the individual based on the demographic information associated with the individual. Thus, the evaluation provided by the evaluator may not accurately assess the individual. As a result, multiple evaluations of the individual may be needed, the individual may repeatedly submit applications to be evaluated, or the like, thereby consuming excessive processing resources and/or network resources. However, it is technically difficult to determine whether the evaluation of the individual was affected by bias, as well as difficult to adjust the evaluation, factoring for bias, using automated methods.

A solution to the above technical problems is described herein for adjusting an evaluation of an individual factoring for bias of an evaluator. In some implementations, a device may generate interaction data for the evaluator based on monitoring a communication session between the individual and the evaluator. The interaction data may be generated based on facial expressions of the evaluator, gestures of the evaluator, a speech cadence of the evaluator, a tone of voice of the evaluator, and/or a wording used by the evaluator, during the communication session. The device may use the interaction data to determine a degree of bias of the evaluator toward the individual during the communication session. For example, to determine the degree of bias, the device may use a model trained to output the degree of bias based on an input of at least the interaction data. The device may adjust the evaluation of the individual based on the degree of bias that is determined. For example, to adjust the evaluation, the device may use a model trained to output an adjustment for the evaluation based on an input of at least the degree of bias that is determined and the evaluation of the individual.

In this way, the device may apply a rigorous and automated process to determine a degree of bias exhibited by the evaluator, and to adjust the evaluation provided by the evaluator based on the degree of bias. The techniques described herein increase accuracy and consistency and reduce delay associated with bias determination and correction. Moreover, the techniques described herein can reduce repeated evaluations of the individual, repetitive application submissions by the individual, or the like, thereby conserving associated processing resources and/or network resources.

FIGS. 1A-1D are diagrams of an example 100 associated with evaluation adjustment factoring for bias. As shown in FIGS. 1A-1D, example 100 includes a device associated with an individual (which may be referred to herein as the "individual device"), a device associated with an evaluator (which may be referred to herein as the "evaluator device"), and an evaluation platform (which may include one or more computing devices). These devices are described in more detail in connection with FIGS. 3 and 4. In some examples, the evaluator may provide an evaluation of the individual (for example, in connection with a job interview, a performance review, an application for a service, an application for a judgment, a medical examination, or the like). For example, the evaluator may be an interviewer, a manager, a social worker, a judge, a doctor, or the like. Similarly, the individual may be an interviewee, an employee, an applicant, a patient, or the like.

As shown in FIG. 1A, and by reference number 105, the individual device and the evaluator device may establish a communication session. For example, the evaluator device may receive a request for a communication session originating from the individual device, or the evaluator device may generate a request for a communication session that is received at the individual device. Acceptance of a request for a communication session may establish the communication session between the individual and the evaluator. In some implementations, the individual device and the evaluator device may communicate in connection with the communication session via the evaluation platform. The communication session may include a telecommunication session, such as a voice call (e.g., a telephone call or a Voice over Internet Protocol (VoIP) call), an electronic chat, a virtual meeting, a video call, among other examples. In some implementations, the communication session may include an in-person meeting.

As shown by reference number 110, the evaluation platform may process data for the communication session to alter a physical appearance and/or a voice of the individual and/or the evaluator. For example, the evaluation platform may obtain an image, video, and/or audio associated with the communication session, and the evaluation platform may process the image, video, and/or audio to alter the physical appearance and/or the voice. As shown by reference number 115, the evaluation platform may cause, during the communication session, presentation of the processed image, video, and/or audio. That is, the processed image, video, and/or audio may be presented during the communication session in place of the actual image, video, and/or audio of the communication session. Alteration of the appearance and/or the voice of the individual may promote a neutral evaluation of the individual that is free of bias. Additionally, alteration of the appearance and/or the voice of the evaluator provides anonymity for both parties to the evaluation.

To alter a physical appearance and/or a voice, the evaluation platform may perform, using data for the communication session, a motion capture and computer animation technique, a deepfake video technique, a vocal pitch shifting technique, a speech synthesis technique, an artificial intelligence technique, or the like. The evaluation platform may alter the physical appearance of the individual and/or the evaluator to a digital avatar, a different person, an inanimate object or animal, or the like. In some implementations, the evaluation platform may alter the physical appearance of the individual to remove or adjust physical characteristics that may elicit bias from the evaluator. The evaluation platform may alter the voice of the individual and/or the evaluator to a different pitch, to a different accent, to a different language, to replace particular words or phrases, or the like. In some implementations, the evaluation platform may alter the voice of the individual to remove or adjust vocal characteristics that may elicit bias from the evaluator. In some implementations, the evaluation platform may process the image, video, and/or audio to conceal demographic information, such as a gender, an age, a race, a sexual orientation, or the like, of the individual and/or the evaluator. In other words, the altered image, video, and/or audio may be gender neutral, age neutral, race neutral, or the like.

In some implementations, the evaluation platform may provide information associated with the individual for presentation on the evaluator device before, during, and/or after the communication session. The information may be associated with a resume, an application, a job performance record, a patient record, or the like. The evaluation platform may modify the information prior to presentation on the evaluator device, such that modified information is presented on the evaluator device in place of the information. The evaluation platform may modify the information using natural language processing of the information. The evaluation platform may modify the information to remove identifying content (e.g., a name, a college graduation year, or the like), neutralize content (e.g., convert a resume item from "treasurer of a sorority" to "treasurer of a college social organization"), genericize content (e.g., convert a name to "Candidate 23"), or the like.

Figure 1B:
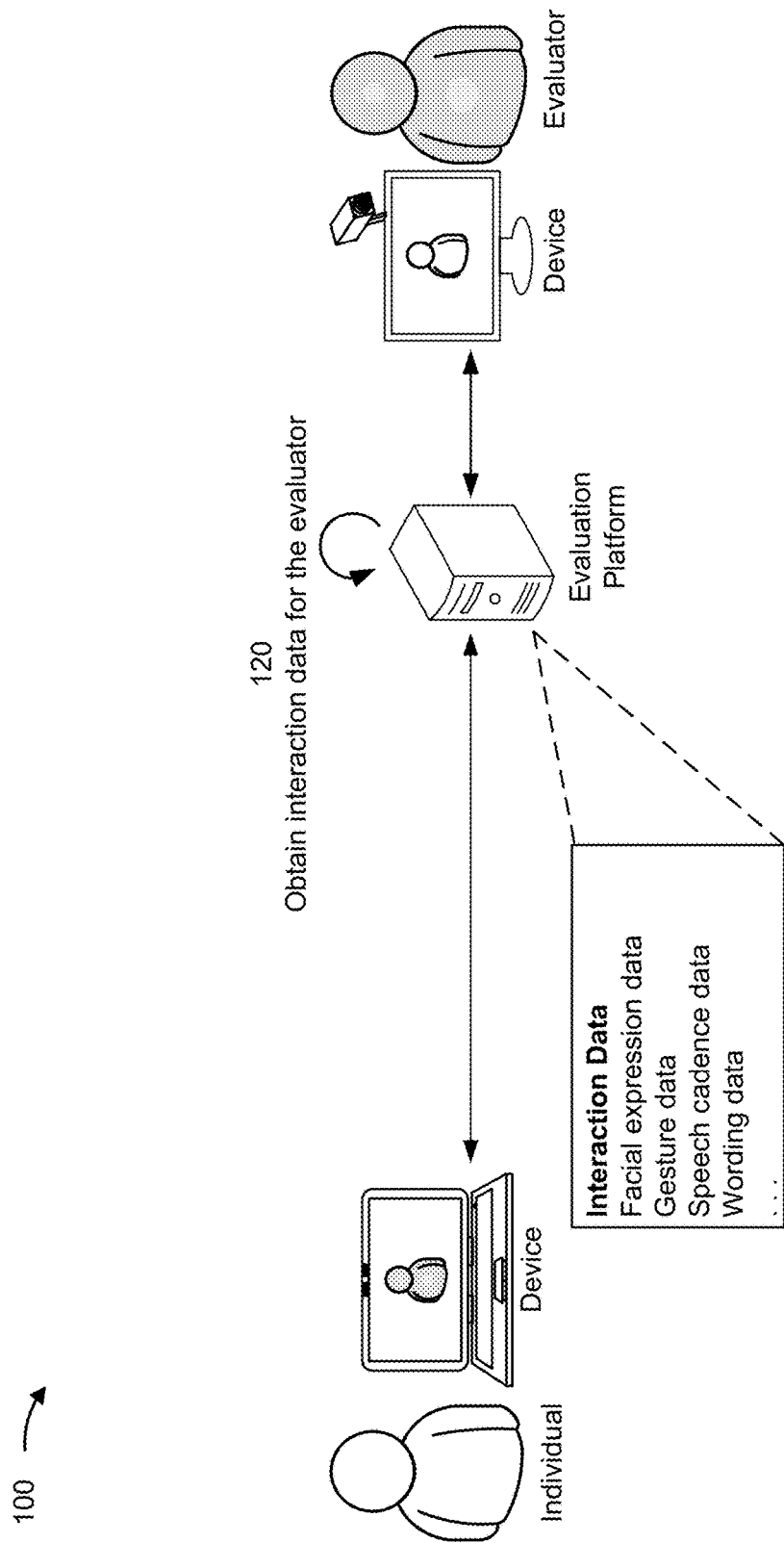

As shown in FIG. 1B, and by reference number 120, the evaluation platform may obtain interaction data for the evaluator. The interaction data may be based on interactions of the evaluator with the individual during the communication session. In some implementations, to obtain the interaction data, the evaluation platform may generate the interaction data. For example, the evaluation platform may monitor the communication session (e.g., monitor image captures for the communication session, video for the communication session, and/or audio for the communication session), and the evaluation platform may generate the interaction data based on monitoring the communication session (e.g., based on interactions of the evaluator with the individual during the communication session). Thus, the interaction data may be generated based on facial expressions of the evaluator, gestures of the evaluator, a speech cadence of the evaluator, a tone of voice of the evaluator, and/or wording used by the evaluator, among other examples, during the communication session.

In some implementations, to obtain the interaction data (e.g., to generate the interaction data), the evaluation platform may use a model (e.g., a machine learning model) that is trained, or otherwise configured, to output the interaction data based on an input of video data, image data, and/or audio data associated with the interactions of the evaluator with the individual during the communication session. The model may be trained to generate the interaction data based on historical data relating to interactions of the evaluator, or one or more different evaluators, with individuals during communication sessions.

In some implementations, the interaction data may identify data associated with facial expressions of the evaluator, gestures of the evaluator, a speech cadence of the evaluator, a tone of voice of the evaluator, and/or wording used by the evaluator, among other examples, during the communication session. For example, with respect to facial expressions, the interaction data may identify types of facial expressions used by the evaluator (e.g., eyebrow raising, eye rolling, jaw clenching, or the like), a quantity of times each type of facial expression was used by the evaluator, a duration of each facial expression used by the evaluator, among other examples. As another example, with respect to wording, the interaction data may identify particular words used by the evaluator, a quantity of times each particular word was used by the evaluator, a category associated with each particular word used by the evaluator, among other examples.

In some implementations, the interaction data may indicate whether facial expressions of the evaluator, gestures of the evaluator, a speech cadence of the evaluator, a tone of voice of the evaluator, and/or wording used by the evaluator, among other examples, during the communication session, are indicative of bias toward the individual. The interaction data may provide a binary indication of bias (e.g., "biased" or "not biased") of the evaluator toward the individual during the communication session. Additionally, or alternatively, the interaction data may provide an indication of a degree of bias (e.g., a percentage, a score, or the like, representative of bias) of the evaluator toward the individual during the communication session. In some implementations, the interaction data may provide a respective indication of bias (e.g., a binary indication and/or a degree of bias) of the evaluator in connection with one or more categories associated with the individual (e.g., a gender category associated with the individual, an age category associated with the individual, or the like). In some implementations, the interaction data may provide a respective indication of bias (e.g., a binary indication and/or a degree of bias) of the evaluator in connection with one or more interaction categories (e.g., a gesture category, a speech cadence category, or the like).

Figure 1C:
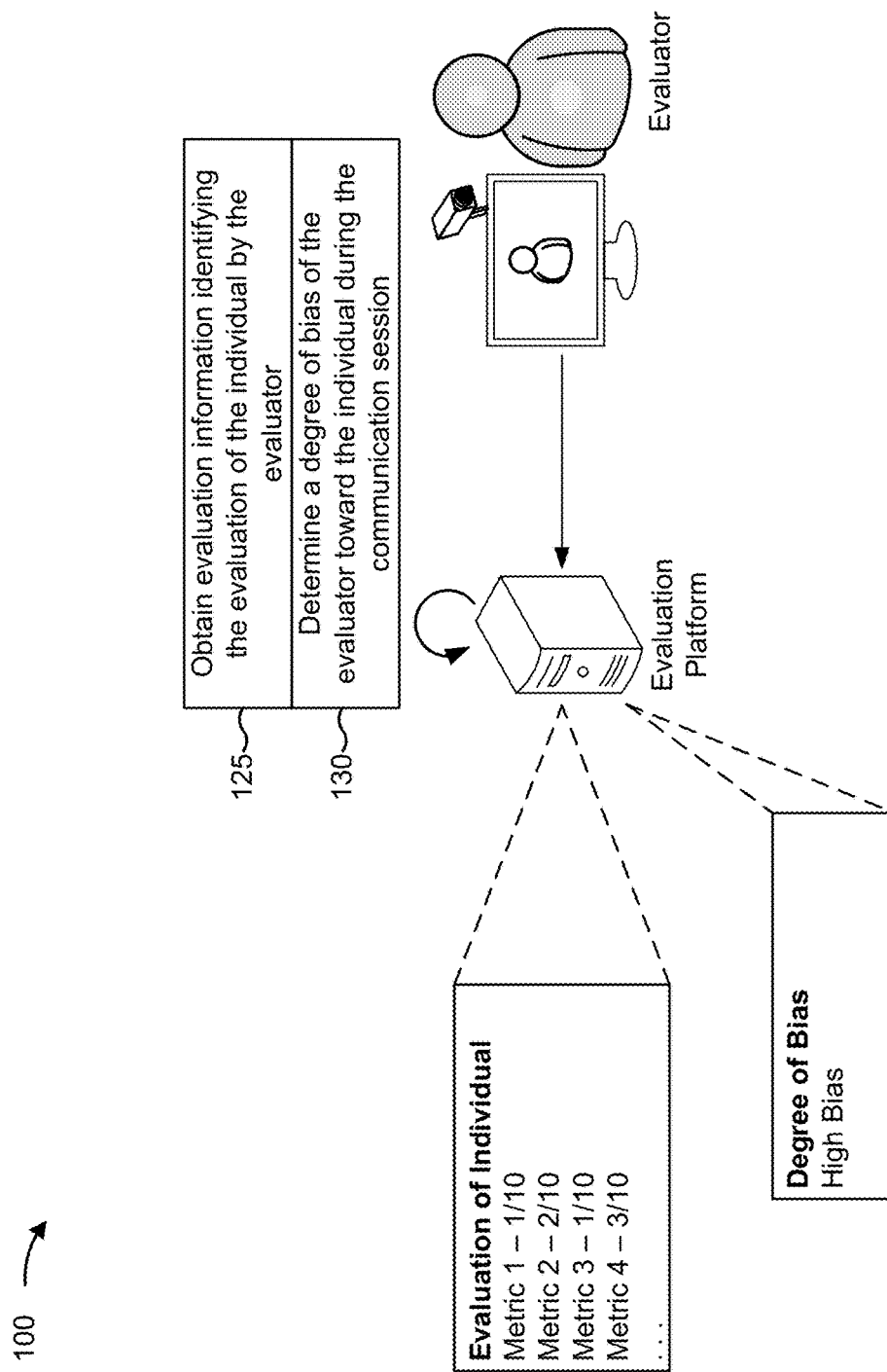

As shown in FIG. 1C, and by reference number 125, the evaluation platform may obtain evaluation information identifying the evaluation of the individual by the evaluator. For example, the evaluator may provide an input of the evaluation information to the evaluation platform. The evaluation platform may obtain (e.g., from the evaluator) the evaluation information after completion of the communication session and/or in an ongoing manner during the communication session. The evaluation information may identify one or more scores associated with the evaluation of the individual by the evaluator. A score may be a numeric score (e.g., on a scale from 1-10), a letter grade (e.g., on a scale from A-F), or the like. Additionally, or alternatively, the evaluation information may identify one or more comments (e.g., textual comments) associated with the evaluation of the individual by the evaluator. The scores and/or the comments may be indicated for one or more metrics (e.g., work experience, education level, demeanor, or the like) on which the individual is evaluated by the evaluator.

In some implementations, the evaluation platform may obtain feedback information identifying feedback from the individual on the communication session with the evaluator. For example, the individual may provide an input of the feedback information to the evaluation platform (e.g., in a response to a questionnaire, a satisfaction survey, or the like). The evaluation platform may obtain (e.g., from the evaluator) the feedback information after completion of the communication session and/or in an ongoing manner during the communication session. The feedback information may identify one or more scores and/or one or more comments, as described above, associated with the feedback from the individual on the communication session with the evaluator.

As shown by reference number 130, the evaluation platform may determine a degree of bias of the evaluator toward the individual during the communication session. For example, the evaluation platform may determine the degree of bias based on at least the interaction data. In some implementations, the evaluation platform may determine the degree of bias based on the interaction data, the evaluation information, the feedback information, information (e.g., demographic information) identifying one or more attributes of the individual, and/or information identifying one or more attributes of an altered appearance or voice of the individual that is presented to the evaluator. The degree of bias determined by the evaluation platform may be a bias score (e.g., on a scale from 1-10, 1-100, or the like) and/or a bias category (e.g., no bias, low bias, moderate bias, high bias, or the like). In some implementations, the evaluation platform may determine a respective degree of bias of the evaluator in connection with one or more categories associated with the individual (e.g., a degree of bias for a gender category associated with the individual, a degree of bias for an age category associated with the individual, or the like).

In some implementations, to determine the degree of bias, the evaluation platform may use a model (e.g., a machine learning model) that is trained, or otherwise configured, to output the degree of bias based on an input of at least one of the interaction data, the evaluation information, the feedback information, information (e.g., demographic information) identifying one or more attributes of the individual, and/or information identifying one or more attributes of an altered appearance or voice of the individual that is presented to the evaluator. The model may be trained to identify a degree of bias based on historical data relating to interactions of the evaluator, or one or more different evaluators, with individuals during communication sessions, evaluations provided by the evaluator or the different evaluators, feedback provided by the individuals, and/or information relating to the individuals, among other examples.

Figure 1D:
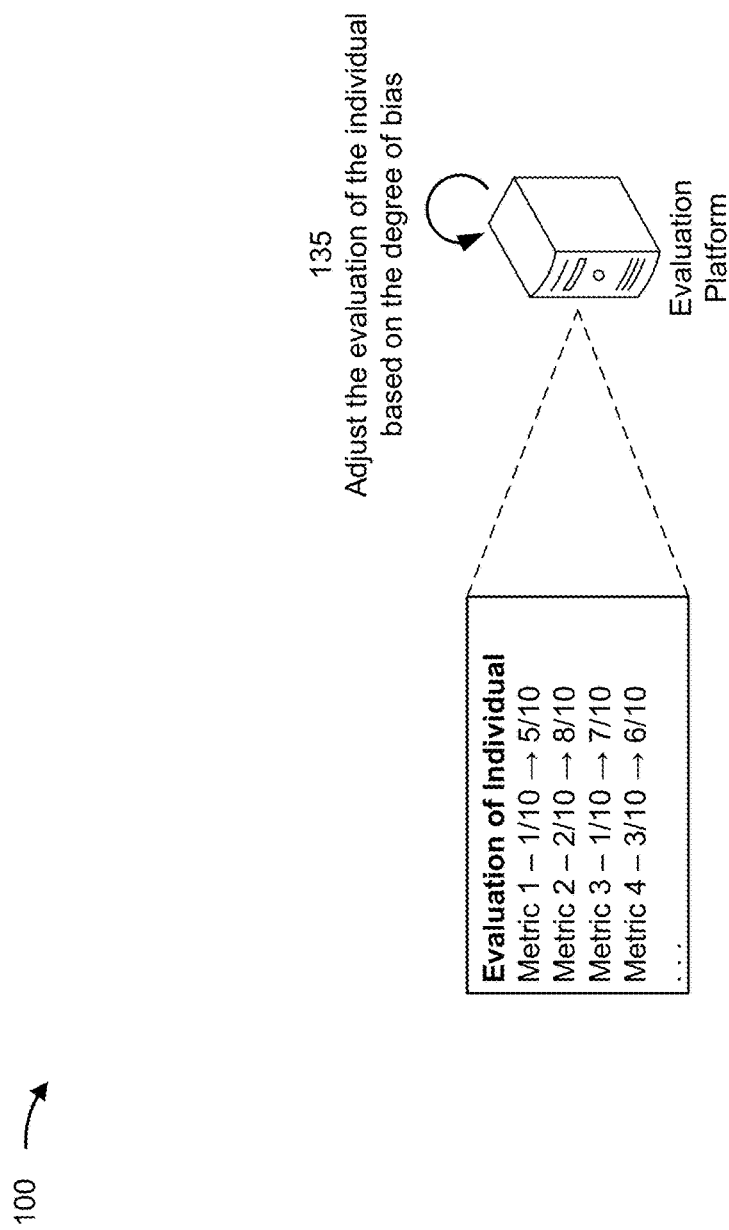

As shown in FIG. 1D, and by reference number 135, the evaluation platform may adjust the evaluation of the individual, provided by the evaluator, based on the degree of bias that is determined. In some implementations, adjusting the evaluation may include increasing or decreasing one or more scores indicated by the evaluation by an amount that is based on the degree of bias. For example, if a high degree of bias is determined, then a score may be adjusted by a higher amount, and if a low degree of bias is determined, then a score may be adjusted by a lower amount. In some implementations, adjusting the evaluation may include modifying comments (e.g., textual comments), or a portion thereof, indicated by the evaluation. For example, if a high degree of bias is determined, then the evaluation platform may modify or remove text from a comment that negatively evaluates the individual to decrease the negativity of the comment and/or increase the positivity of the comment. As an example, the evaluation platform may modify the comment "his work product is terrible" to "his work product needs improvement." The evaluation platform may use natural language processing, sentiment analysis, or other artificial intelligence techniques, among other examples, to modify comments of the evaluation.

In some implementations, the evaluation platform may adjust the evaluation in connection with one or more first metrics, and refrain from adjusting the evaluation in connection with one or more second metrics, based on respective degrees of bias of the evaluator in connection with one or more categories associated with the individual (e.g., based on correlations between metrics and categories). Additionally, or alternatively, the evaluation platform may adjust the evaluation in connection with one or more first metrics by a first amount, and adjust the evaluation in connection with one or more second metrics by a second amount, based on respective degrees of bias of the evaluator in connection with one or more categories associated with the individual. For example, a metric of the evaluation relating to the sufficiency of the individual's work experience may be adjusted based on the evaluator being associated with a high degree of bias against younger individuals, whereas a metric of the evaluation relating to the individual's education level may not be adjusted, or may be adjusted by a lesser extent, based on the evaluator being associated with a high degree of bias against younger individuals.

In some implementations, to adjust the evaluation, the evaluation platform may use a model (e.g., a machine learning model) that is trained, or otherwise configured, to output an indication of the adjustments to the evaluation, or to output an adjusted evaluation, based on an input of information relating to the degree of bias of the evaluator and the evaluation information. The model may be trained to identify an adjustment to the evaluation based on historical data relating to bias of the evaluator or one or more different evaluators, evaluations provided by the evaluator or the different evaluators, and/or adjusted versions of the evaluations provided by the evaluator or the different evaluators, among other examples.

The evaluation platform may perform one or more additional actions (e.g., based on adjusting the evaluation). In some implementations, the evaluation platform may schedule another communication session between the individual and a different evaluator based on adjusting the evaluation of the individual. For example, if a quantity of adjustments satisfies a threshold and/or an amount by which metrics are adjusted satisfies a threshold, then the evaluation platform may schedule another communication session. The evaluation platform may determine a different evaluator based on historical bias data and one or more categories associated with the individual. For example, the evaluation platform may determine a different evaluator that is historically associated with no bias or low bias toward the one or more categories associated with the individual. To schedule another communication session, the evaluation platform may generate a meeting for a calendar application of the individual and/or the different evaluator, transmit a meeting invitation to the individual device and/or a device of the different evaluator, or the like.

In some implementations, the evaluation platform may generate a report relating to the bias of the evaluator during the communication session. For example, the report may identify one or more questions of the evaluator during the communication session associated with bias, one or more statements of the evaluator during the communication session associated with bias, and/or or one or more tasks requested by the evaluator during the communication session associated with bias, among other examples. The evaluation platform may transmit the report to the evaluator device and/or a device associated with a manager of the evaluator. In some implementations, the evaluation platform may generate a flag indicative of the bias of the evaluator and/or indicative of one or more categories associated with the individual for which bias of the evaluator was determined.

In some implementations, to generate the report, the evaluation platform may use a model (e.g., a machine learning model) that is trained, or otherwise configured, to output questions, statements, and/or tasks associated with bias based on an input of video data, audio data, and/or transcript data associated with the communication session and/or the feedback information. The model may be trained to identify questions, statements, and/or tasks associated with bias based on historical data relating to questions, statements, and/or tasks (e.g., labeled by a subject matter expert). Further refinement of the model may be based on feedback information from one or more individuals and/or adjustment by a subject matter expert.

In this way, the evaluation platform may quantify the bias of the evaluator toward the individual during the communication and make appropriate adjustments to the evaluation provided by the evaluator based on the bias. As described above, the evaluation platform may employ a rigorous and automated process that increases accuracy and consistency and reduces delay associated with bias determination and correction. Moreover, adjustment of the evaluation produces a more accurate assessment of the individual. Thus, the operations performed by the evaluation platform may reduce repeated evaluations of the individual, repetitive application submissions by the individual, or the like, thereby conserving associated processing resources and/or network resources.

As indicated above, FIGS. 1A-1D are provided as an example. Other examples may differ from what is described with regard to FIGS. 1A-1D.

Figure 2:
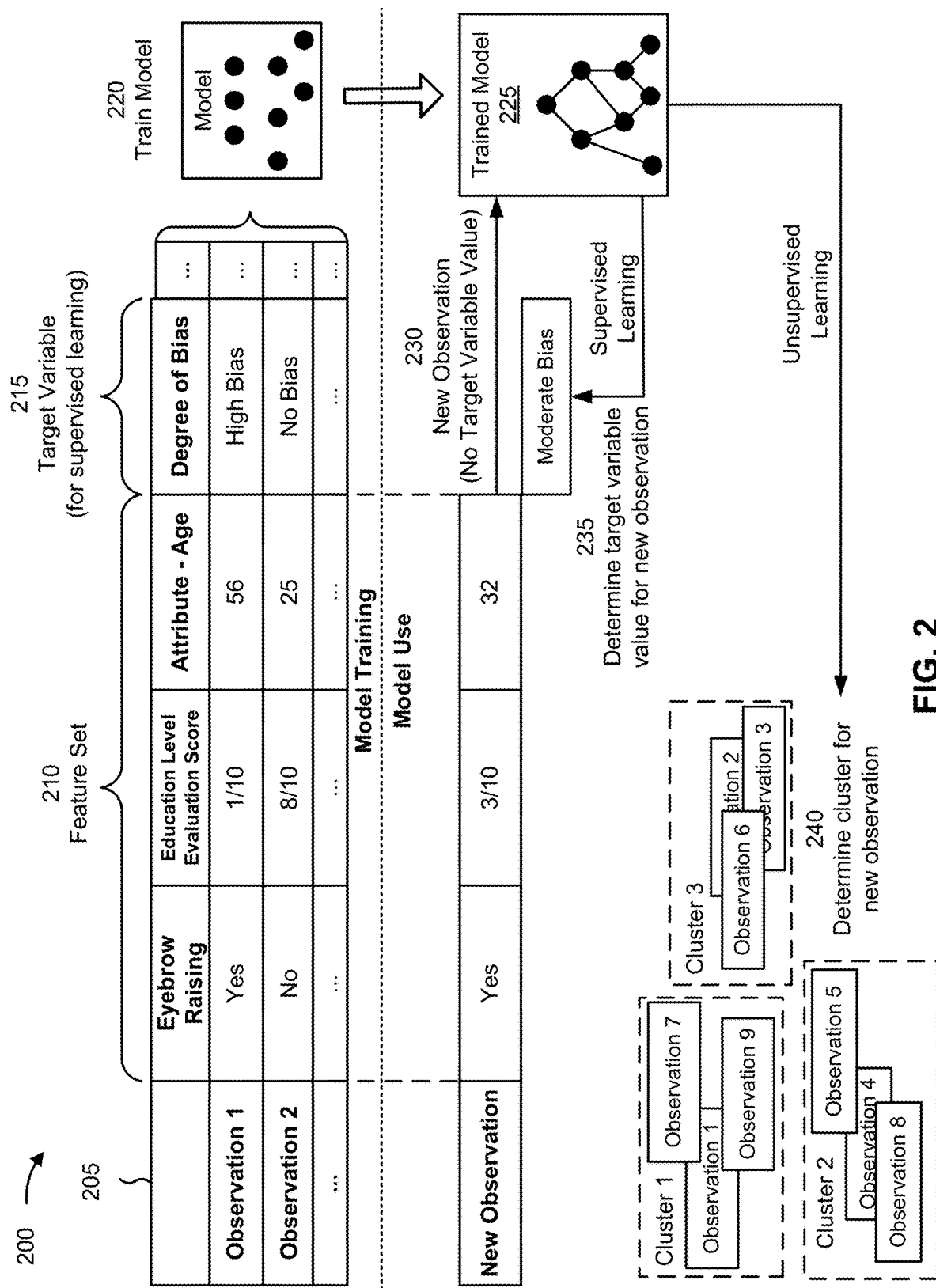
FIG. 2 is a diagram illustrating an example of training and using a machine learning model in connection with bias identification.

FIG. 2 is a diagram illustrating an example 200 of training and using a machine learning model in connection with bias identification. The machine learning model training and usage described herein may be performed using a machine learning system. The machine learning system may include or may be included in a computing device, a server, a cloud computing environment, or the like, such as the evaluation platform (e.g., a server device) described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the evaluation platform, the individual device, and/or the evaluator device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the evaluation platform. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of eyebrow raising, a second feature of an evaluation score for education level, a third feature of an age attribute of an individual, and so on. As shown, for a first observation, the first feature may have a value of Yes (e.g., indicating that an evaluator engaged in eyebrow raising during a communication session), the second feature may have a value of $1/10$ (e.g., indicating a score given by an evaluator in an evaluation of an individual's educational background), the third feature may have a value of 56 years old, and so on. These features and feature values are provided as examples, and may differ in other examples. For example, the feature set may include one or more of the following features: whether and/or for how long an evaluator engaged in shrugging, pointing, eyebrow raising, squinting, jaw clenching, eye rolling, head shaking, or the like; an average vocal pitch frequency of an evaluator; a speech speed of an evaluator, whether an evaluator used one or more particular words or phrases; an evaluation score given for an individual's education level, work experience, timeliness, poise, conversational ability, or the like; an attribute of an individual relating to age, gender, sexual orientation, race, ethnicity, or the like; among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is degree of bias, which has a value of high bias for the first observation.

The feature set and target variable described above are provided as examples, and other examples may differ from what is described above. For example, for a target variable of evaluation adjustment amount, the feature set may include an evaluation score given for an individual's education level, work experience, timeliness, poise, conversational ability, or the like; an attribute of an individual relating to age, gender, sexual orientation, race, ethnicity, or the like; a degree of bias determined for an evaluator relating to a particular age category, a particular gender category, a particular sexual orientation category, a particular race category, a particular ethnicity category, or the like; among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of eyebrow raising, a second feature of an evaluation score for education level, a third feature of an age attribute of an individual, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of moderate bias for the target variable of degree of bias for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to adjust an evaluation of an individual, a recommendation to accept an evaluation of an individual, a recommendation to schedule a new evaluation for an individual, or the like. The first automated action may include, for example, generating an adjusted evaluation, scheduling a new evaluation, generating a report, or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., high bias), then the machine learning system may provide a first recommendation, such as the first recommendation described above. Additionally, or alternatively, the machine learning system may perform a first automated action and/or may cause a first automated action to be performed (e.g., by instructing another device to perform the automated action)

based on classifying the new observation in the first cluster, such as the first automated action described above.

As another example, if the machine learning system were to classify the new observation in a second cluster (e.g., low bias), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to identify bias and/or adjust an evaluation. The machine learning system enables recognition and/or identification of tens, hundreds, thousands, or millions of features and/or feature values for tens, hundreds, thousands, or millions of observations, thereby increasing accuracy and consistency and reducing delay associated with identifying bias and/or adjusting an evaluation relative to requiring computing resources to be allocated for tens, hundreds, or thousands of operators to manually identify bias and/or adjust an evaluation using the features or feature values.

As indicated above, FIG. 2 is provided as an example. Other examples may differ from what is described in connection with FIG. 2.

Figure 3:
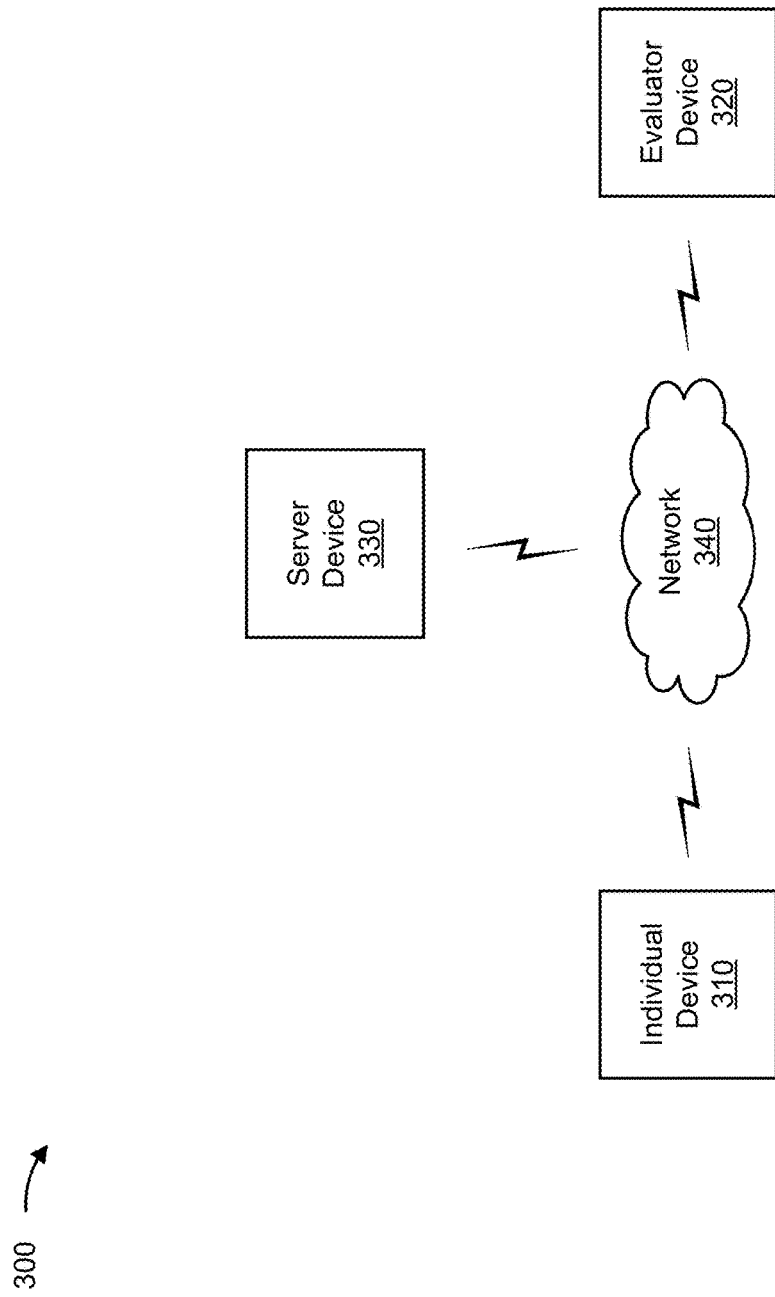
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an individual device 310, an evaluator device 320, a server device 330, and a network 340. Devices of environment 300 may interconnect via wired connections, wireless connections, or a combination of wired and wireless connections.

The individual device 310 (e.g., a user device) includes one or more devices capable of receiving, generating, storing, processing, and/or providing information associated with a communication session and/or feedback for a communication session, as described elsewhere herein. The individual device 310 may include a communication device and/or a computing device. For example, the individual device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The evaluator device 320 (e.g., a user device) includes one or more devices capable of receiving, generating, storing, processing, and/or providing information associated with a communication session and/or an evaluation of an individual, as described elsewhere herein. The evaluator device 320 may include a communication device and/or a computing device. For example, the evaluator device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 330 includes one or more devices capable of receiving, generating, storing, processing, providing, and/or routing information associated with a communication session, feedback for a communication session, and/or an evaluation of an individual, as described elsewhere herein. The server device 330 may implement the evaluation platform, described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 includes computing hardware used in a cloud computing environment.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The quantity and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
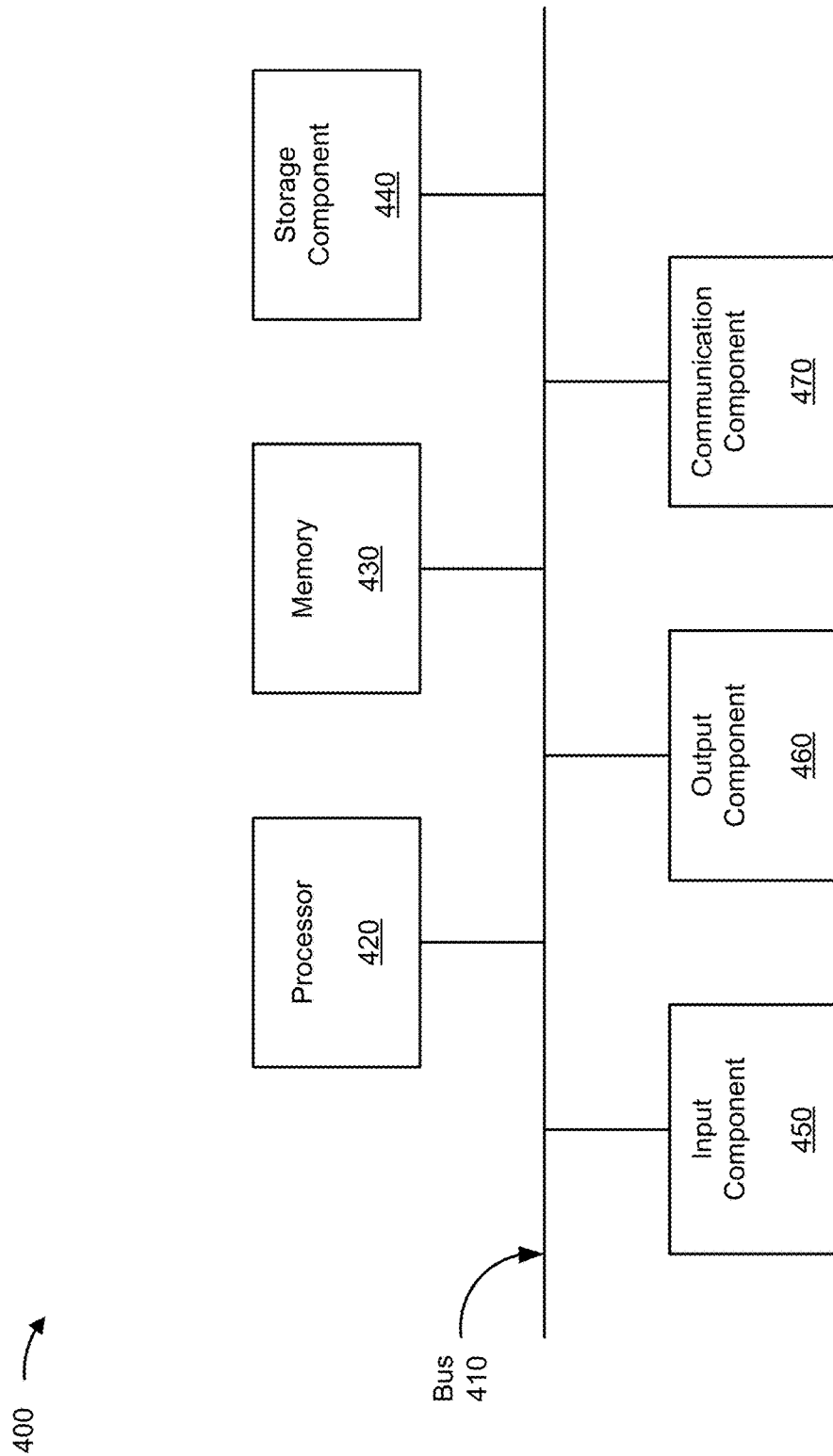
FIG. 4 is a diagram of example components of one or more devices of FIG. 3.

FIG. 4 is a diagram of example components of a device 400, which may correspond to individual device 310, evaluator device 320, and/or server device 330. In some implementations, individual device 310, evaluator device 320, and/or server device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with evaluation adjustment factoring for bias. In some implementations, one or more process blocks of FIG. 5 may be performed by a device (e.g., the evaluation platform, the server device 330, or the like). In some implementations, one or more process blocks of FIG. 5 may be performed by another device or a group of devices separate from or including the device, such as the individual device 310 and/or the evaluator device 320. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include monitoring a communication session between an individual and an evaluator that is to provide the evaluation of the individual (block 510). As further shown in FIG. 5, process 500 may include generating interaction data for the evaluator based on interactions of the evaluator with the individual during the communication session (block 520). As further shown in FIG. 5, process 500 may include obtaining evaluation information identifying the evaluation of the individual by the evaluator (block 530). As further shown in FIG. 5, process 500 may include determining a degree of bias of the evaluator toward the individual during the communication session based on at least the interaction data (block 540). As further shown in FIG. 5, process 500 may include adjusting the evaluation of the individual based on the degree of bias of the evaluator (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A system comprising:
one or more memories; and
one or more processors, coupled to the one or more memories, configured to:
   monitor a communication session between a first user device and a second user device;
   generate interaction data based on interactions during the communication session, wherein the one or more processors, to generate the interaction data, are configured to input at least one of video data, image data, or audio data, obtained during the communication session, into a machine learning model trained using historical data associated with bias identification to cause the machine learning model to output the interaction data;
   obtain, based at least in part on the interaction data and during the communication session, evaluation information identifying an evaluation of an individual;
   determine a degree of bias of an evaluator toward the individual based on the interaction data;
   process at least one of an image, video, or audio associated with the communication session, wherein processing comprises dynamically selecting, during the communication session, a type of adjustment to at least one of: a physical appearance of a user or a voice of a user, based on the degree of bias of the evaluator using a trained machine learning model, to alter a physical appearance or a voice of a user associated with the communication session;
   cause presentation, during the communication session, of the at least one of the image, video, or audio that is processed to alter the physical appearance or voice of the user;
   modify, using natural language processing or sentiment analysis, at least a portion of a textual comment included in the evaluation information by reducing a negative tone or increasing a positive tone of the textual comment based on the degree of bias; and
   adjust the evaluation information in connection with a plurality of metrics, wherein the evaluation information is adjusted by a plurality of different amounts based on the degree of bias.

2. The system of claim 1,
wherein the communication session includes at least one of a voice call or a video call.

3. The system of claim 1,
wherein the one or more processors are further configured to:
   schedule another communication session based on adjusting the evaluation information.

4. The system of claim 1,
wherein the one or more processors are further configured to:
   receive feedback information identifying feedback from the user; and
   refine the machine learning model based on the feedback information.

5. The system of claim 1,
wherein the one or more processors are further configured to:
   determine indications of bias during the communication session in connection with one or more categories corresponding to the user.

6. The system of claim 1,
wherein adjusting the evaluation information includes modifying portions of a textual comment indicated by the evaluation information.

7. The system of claim 1,
wherein the one or more processors are further configured to:
   generate a report relating to a bias associated with the communication session.

8. A method of adjusting an evaluation to factor for bias, comprising:
   obtaining, by a device, interaction data for an evaluator in a communication session with an individual based on interactions of the evaluator with the individual during the communication session, wherein the evaluator is to provide the evaluation of the individual;
   determining, by the device and using a first machine learning model, a degree of bias of the evaluator toward the individual during the communication session and in connection with a plurality of categories associated with the individual;
   processing, by the device, at least one of an image, video, or audio associated with the communication session, wherein processing comprises, during the communication session, altering at least one of: a physical appearance of a user, or a voice of a user, to an extent selected based on the degree of bias of the evaluator, using a second machine learning model;
   causing presentation, during the communication session, of the at least one of the image, video, or audio that is processed to alter the physical appearance or voice of the user;
   obtaining, by the device and during the communication session, evaluation information identifying the evaluation of the individual; and
   adjusting, by the device, the evaluation information in connection with a plurality of metrics, wherein the evaluation information is adjusted by a plurality of different amounts based on the degree of bias, and wherein adjusting the evaluation information includes modifying, using natural language processing or sentiment analysis, at least a portion of a textual comment included in the evaluation information by reducing a negative tone or increasing a positive tone of the textual comment based on the degree of bias.

9. The method of claim 8, wherein the degree of bias of the evaluator is determined using a model trained to output the degree of bias based on an input of at least one of the interaction data, the evaluation information, information identifying one or more attributes of the individual, information identifying one or more attributes of an altered appearance or voice of the individual that is presented to the evaluator during the communication session, or feedback from the individual on the communication session with the evaluator.

10. The method of claim 8, wherein the evaluation of the individual is adjusted using a model trained to output an adjustment for the evaluation based on an input of the degree of bias of the evaluator and the evaluation information.

11. The method of claim 8, wherein adjusting the evaluation of the individual comprises:
   increasing or decreasing one or more scores indicated by the evaluation by an amount that is based on the degree of bias.

12. The method of claim 8, further comprising:
   generating a report that identifies at least one of one or more questions of the evaluator during the communication session, one or more statements of the evaluator during the communication session, or one or more tasks requested by the evaluator during the communication session, associated with bias.

13. A non-transitory computer-readable medium storing a set of instructions for adjusting an evaluation to factor for bias, the set of instructions comprising:
one or more instructions that, when executed by one or more processors of a device, cause the device to:
monitor a telecommunication session between an individual and an evaluator that is to provide the evaluation of the individual;
generate, based on monitoring the telecommunication session, interaction data for the evaluator based on interactions of the evaluator with the individual during the telecommunication session;
obtain, based at least in part on the interaction data, evaluation information identifying the evaluation of the individual by the evaluator;
determine a degree of bias of the evaluator toward the individual during the telecommunication session based on at least the interaction data and the evaluation information;
process at least one of an image, video, or audio associated with the telecommunication session, wherein processing comprises, during the telecommunication session, altering at least one of: a physical appearance of a user, or a voice of the user, to an extent selected based on the degree of bias of the evaluator, using a trained machine learning model;
cause presentation, during the telecommunication session, of the at least one of the image, video, or audio that is processed to alter the physical appearance or voice of the user;
modify, using natural language processing or sentiment analysis, at least a portion of a textual comment included in the evaluation information by reducing a negative tone or increasing a positive tone of the textual comment based on the degree of bias, wherein the textual comment indicated by the evaluation information is modified in an amount proportional to the degree of bias of the evaluator; and
adjust the evaluation of the individual based on the degree of bias of the evaluator.

14. The non-transitory computer-readable medium of claim 13, wherein the degree of bias of the evaluator is determined using a model trained to output the degree of bias based on an input of at least one of the interaction data, the evaluation information, information identifying one or more attributes of the individual, information identifying one or more attributes of an altered appearance or voice of the individual that is presented to the evaluator during the telecommunication session, or feedback from the individual on the telecommunication session with the evaluator.

15. The non-transitory computer-readable medium of claim 13, wherein the interaction data indicates whether facial expressions of the evaluator, gestures of the evaluator, a speech cadence of the evaluator, a tone of voice of the evaluator, or wording used by the evaluator, during the telecommunication session, is indicative of bias toward the individual.

16. The non-transitory computer-readable medium of claim 13, wherein the degree of bias of the evaluator is determined further based on at least one of the evaluation information, one or more attributes of the individual, one or more attributes of an altered appearance or voice of the individual that is presented to the evaluator during the telecommunication session, or feedback from the individual on the telecommunication session with the evaluator.

17. The non-transitory computer-readable medium of claim 13, wherein the one or more instructions, when executed by the one or more processors, further cause the device to:
generate a report that identifies at least one of one or more questions of the evaluator during the telecommunication session, one or more statements of the evaluator during the telecommunication session, or one or more tasks requested by the evaluator during the telecommunication session, associated with bias.

18. The system of claim 1, wherein the one or more processors are further configured to generate a report that identifies one or more tasks requested by the evaluator during the communication session associated with bias.

19. The method of claim 8, further comprising generating a report that identifies one or more tasks requested by the evaluator during the communication session associated with bias.

20. The non-transitory computer-readable medium of claim 13, wherein the one or more instructions, when executed by the one or more processors, further cause the device to generate a report that identifies one or more tasks requested by the evaluator during the telecommunication session associated with bias.

* * * * *